United States Patent
Liu et al.

(10) Patent No.: US 9,319,896 B2
(45) Date of Patent: Apr. 19, 2016

(54) BEAM-CHANGE INDICATION FOR CHANNEL ESTIMATION IMPROVEMENT IN WIRELESS NETWORKS

(71) Applicant: MEDIATEK Singapore Pte. Ltd., Singapore (SG)

(72) Inventors: Jianhan Liu, San Jose, CA (US); Thomas Edward Pare, Mountain View, CA (US); Chao-Chun Wang, Taipei (TW); James June-Ming Wang, San Marino, CA (US); YungPing Hsu, Taipei (TW)

(73) Assignee: MEDIATEK Singapore Ple. Ltd., Singapore (SG)

( * ) Notice: Subject to any disclaimer, the term of this patent is extended or adjusted under 35 U.S.C. 154(b) by 188 days.

(21) Appl. No.: 13/875,461

(22) Filed: May 2, 2013

(65) Prior Publication Data

US 2013/0343211 A1   Dec. 26, 2013

Related U.S. Application Data

(60) Provisional application No. 61/642,194, filed on May 3, 2012, provisional application No. 61/642,628, filed on May 4, 2012.

(51) Int. Cl.
| | |
|---|---|
| *H04L 12/28* | (2006.01) |
| *H04W 24/02* | (2009.01) |
| *H04L 25/02* | (2006.01) |
| *H04B 7/06* | (2006.01) |
| *H04L 25/03* | (2006.01) |
| *H04B 7/04* | (2006.01) |

(52) U.S. Cl.
CPC ............ *H04W 24/02* (2013.01); *H04B 7/0695* (2013.01); *H04L 25/0204* (2013.01); *H04L 25/0228* (2013.01); *H04B 7/0413* (2013.01); *H04B 7/0617* (2013.01); *H04B 7/0619* (2013.01); *H04L 2025/03783* (2013.01)

(58) Field of Classification Search
None
See application file for complete search history.

(56) References Cited

U.S. PATENT DOCUMENTS

| 8,644,368 | B1* | 2/2014 | Zhang et al. ................... 375/221 |
| 2008/0085681 | A1* | 4/2008 | Wang et al. ..................... 455/72 |
| 2010/0104038 | A1* | 4/2010 | Stager et al. ................... 375/267 |
| 2010/0189167 | A1* | 7/2010 | Pare et al. ..................... 375/219 |

(Continued)

OTHER PUBLICATIONS

EPO, Office Action for the EP patent application 13166194 dated Sep. 25, 2014 (6 pages).

*Primary Examiner* — Timothy J Weidner
*Assistant Examiner* — Jana Blust
(74) *Attorney, Agent, or Firm* — Imperium Patent Works; Zheng Jin

(57) ABSTRACT

A method of channel estimation enhancement is provided. In a wireless communications system, a transmitting device transmits a long preamble frame comprising a first training field, a signal field, and a second training field. The signal field has a beam-change indicator bit indicates whether there is beam change between the first training field and the second training field. A receiving device receives the long preamble frame, performs a first channel estimation based on the first training field, and performs a second channel estimation based on the second training field. If the beam-change indicator bit indicates negative beam change, then the receiving device performs channel estimation enhancement by combining the first channel estimation and the second channel estimation. As a result, channel estimation performance is improved.

16 Claims, 5 Drawing Sheets

(56) References Cited

U.S. PATENT DOCUMENTS

| | | | |
|---|---|---|---|
| 2011/0280188 A1* | 11/2011 | Jeon et al. | 370/328 |
| 2012/0020261 A1* | 1/2012 | Van Zelst et al. | 370/310 |
| 2012/0327871 A1* | 12/2012 | Ghosh et al. | 370/329 |
| 2013/0044742 A1* | 2/2013 | Zhang et al. | 370/338 |
| 2013/0114757 A1* | 5/2013 | Park et al. | 375/295 |
| 2013/0142095 A1* | 6/2013 | Calcev et al. | 370/311 |
| 2013/0148644 A1* | 6/2013 | Suh et al. | 370/338 |
| 2013/0177115 A1* | 7/2013 | Yang et al. | 375/347 |
| 2013/0235860 A1* | 9/2013 | Vermani et al. | 370/338 |
| 2014/0328335 A1* | 11/2014 | Zhang | 370/338 |
| 2015/0023288 A1* | 1/2015 | Vermani et al. | 370/329 |

* cited by examiner

BEAM-CHANGE INDICATION FOR CHANNEL ESTIMATION IMPROVEMENT IN WIRELESS NETWORKS

CROSS REFERENCE TO RELATED APPLICATIONS

This application claims priority under 35 U.S.C. §119 from U.S. Provisional Application No. 61/642,194, entitled "Beam-Change Indication for Channel Estimation Improvement in Wireless Networks," filed on May 3, 2012; U.S. Provisional Application No. 61/642,628, entitled "Beam-Change Indication for Channel Estimation Improvement in Wireless Networks," filed on May 4, 2012, the subject matter of which is incorporated herein by reference.

TECHNICAL FIELD

The disclosed embodiments relate generally to wireless network communications, and, more particularly, to beam-change indication for channel estimation improvement in wireless communications systems.

BACKGROUND

In wireless communications, CSI (channel state information) refers to known channel properties of a communication link. This information describes how a signal propagates from the transmitter to the receiver and represents the combined effect of, for example, scattering, fading, and power decay with distance. The CSI makes it possible to adapt transmissions to current channel conditions, which is crucial for achieving reliable communication with high data rates in multi-antenna systems.

CSI needs to be estimated at the receiver and usually quantized and feedback to the transmitter. Since the channel condition vary, instantaneous CSI needs to be estimated on a short-term basis. A popular approach is so-called training sequence (or pilot sequence), where a known signal is transmitted and a channel response matrix H is estimated using the combined knowledge of the transmitted and the received signal.

Channel estimation inaccuracy is one key factor that degrades the performance of wireless networks. In wireless networks, various methods of enhancing channel estimation accuracy have been widely used. For example, channel smoothing when the channels of adjacent sub-carriers are similar, data-aided feedback channel tracking when complexity and latency are not critical, and pilots-based channel tracking when pilots are enough.

IEEE 802.11 is a set of standards for implementing wireless local area network (WLAN) communication in the 2.4, 3.6, 5, and 60 GHz frequency bands. Within the IEEE 802.11 standards, IEEE 802.11ac covers very high throughput with potential improvements over IEEE 802.11n, while upcoming IEEE 802.11ah covers Sub 1 GHz sensor network and smart metering. In the present invention, a useful method is proposed to enhance channel estimation performance based on the IEEE 802.11ac and the upcoming IEEE 802.1ah standards.

SUMMARY

A method of channel estimation enhancement is provided. In a wireless communications system, a transmitting device transmits a long preamble frame comprising a first training field, a signal field, and a second training field. The transmitting devices applies a first set of beam-steering matrices to a first training sequence and generates the first training filed, and applies a second set of beam-steering matrices to a second training sequence to generate the second training field. The signal field has a beam-change indication bit indicates whether there is beam change between the first training field and the second training field. In one embodiment, the beam-change indication bit is determined by comparing the first set of beam-steering matrices and the second set of beam-steering matrices for all subcarriers. If the matrices are equal for all subcarriers, then the indication bit is set to zero indicating no beam change between the two training fields.

A receiving device receives the long preamble frame, performs a first channel estimation based on the received first training field, and performs a second channel estimation based on the received second training field. The receiving device also decodes the beam-change indication bit from the received signal field. If the beam-change indication bit indicates no beam change, then the receiving device performs channel estimation enhancement by combining the first channel estimation and the second channel estimation. As a result, channel estimation performance is improved. In one embodiment, the beam-change indication bit is also used to determine whether to apply channel smoothing.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figures 1, 2:
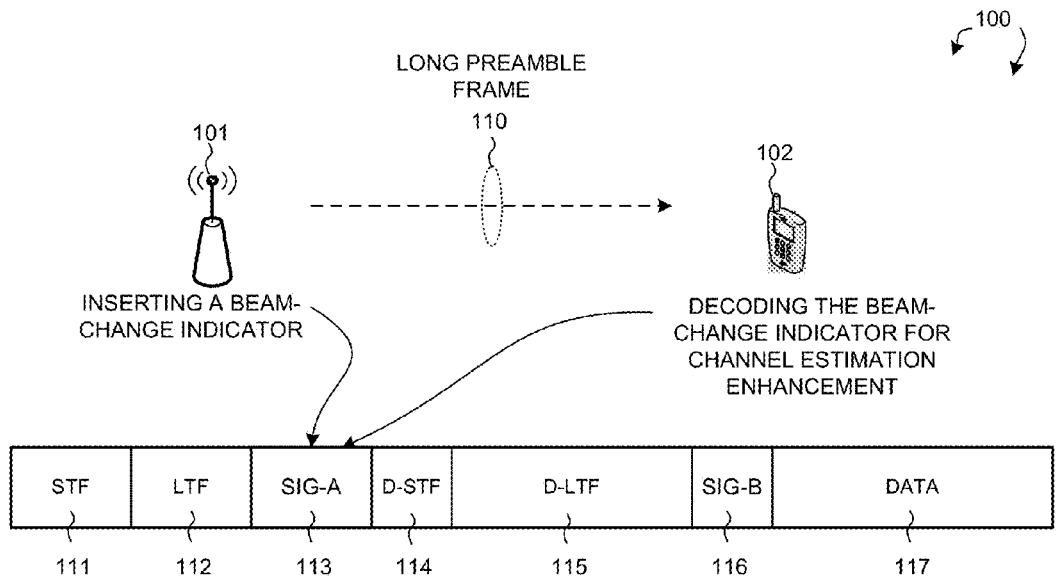
FIG. 1 illustrates a wireless communications system and a long preamble frame structure in accordance with a novel aspect.
FIG. 2 is a diagram of a long preamble frame and a signal field of the long preamble frame.

FIG. 1 illustrates a wireless communications network 100 and a long preamble frame 110 in accordance with one novel aspect. Wireless communications network 100 comprises a wireless access point AP 101 and a wireless station STA 102. In wireless communications systems, wireless devices communicate with each other through various well-defined frame structures. In general, a frame comprises a Physical Layer Convergence Procedure (PLCP) Protocol Data Unit (PPDU), a frame header, and a payload. Frames are in turn divided into very specific and standardized sections. For example, in the upcoming IEEE 802.11ah standard, a transmitter is required to be able to transmit a long preamble frame structure over 2 MHz, 4 MHz, 6 MHz, 8 MHz, and 16 MHz channels.

In the example of FIG. 1, a long preamble frame 110 is transmitted from AP 101 to STA 102. Long preamble frame 110 comprises a short training field (STF 111), a long training field (LTF 112), a signal A field (SIG-A 113), a short training field for data (D-STF 114), a long training field for data (D-LTF 115), a signal B field (SIG-B 116), and data 117. LTF 112 is used for channel estimation and the decoding of SIG-A at the receiver side, while D-LTF 115 is used for channel estimation and the decoding of SIG-B and data at the receiver side. When long preamble frame 110 is transmitted, beam steering matrices can be applied to the long preamble frame for beamforming to achieve spatial expansion or other purposes. With such long preamble frame structure, two different sets of beam steering matrices are typically applied. For example, a first set of beam steering matrices W(k) is applied to each subcarrier k of fields STF, LTF, and SIG-A (e.g., those fields are also referred to as the Omni portion of the long preamble frame). On the other hand, a second set of beam steering matrices Q(k) is applied to each subcarrier k of fields D-STF, D-LTF, SIG-B, and data (e.g., also referred to as the Data portion of the long preamble frame). The dimension of W(k) and Q(k) is related to the number of antenna and the number of data streams to be transmitted in a corresponding MIMO scheme.

Based on each transmitter, the beam steering matrices W(k) and Q(k) may either be the same or different. This is because W(k) may be a column vector with N-th TX antenna elements with element $i_{TX}$ being $\exp(-j2\pi k\Delta_F T_{CS}^{iTX})$, where $T_{CS}^{iTX}$ represents the cyclic shift for transmitter chain $i_{TX}$ (e.g., for Omni-directional transmission), while Q(k) may be precoding matrices (e.g., for MIMO beamforming transmission) based on previous channel sounding feedback. However, the beam steering matrices W(k) and Q(k) may be exactly the same under certain scenarios. For example, when there is no channel feedback information, both W(k) and Q(k) are identity matrices I(k). Therefore, for the same communication link between a transmitter and a receiver, the channel condition for transmitting STF, LTF, SIG-A and the channel condition for transmitting D-STF, D-LTF, SIG-B, and data, may either be the same or different, depending on W(k) and Q(k).

At the receiver side, channel estimation is performed based on received LTF and D-LTF symbols. If the beam steering matrices W(k) and Q(k) are the same, then the channel condition used to transmit STF, LTF, SIG-A is the same as the channel condition used to transmit D-STF, D-LTF, SIG-B, and data. Traditionally, channel estimation for data is performed only based on D-LTF symbols. In one novel aspect, the channel estimation for data can be enhanced by utilizing channel estimation based on both LTF and D-LTF symbols if the channel condition (e.g., the beam steering matrices) has not been changed by the transmitter. In one embodiment, as illustrated in FIG. 1, a beam-change indicator is inserted by AP 101 at the transmitter side, and at the receiver side, STA 102 decodes the beam-change indicator from the signal field to achieve channel estimation enhancement.

FIG. 2 is a diagram of a long preamble frame structure and a signal field of the long preamble frame. Table 201 lists all the fields including a signal A filed SIG-A of the long preamble frame. In the upcoming IEEE 802.ah standard, there are two SIG-A symbols defined for single user (SU) long preamble PPDUs. Table 202 lists the structure inside a first SIG-A-1 symbol. For example, SIG-A-1 symbol includes a one-bit MU/SU field, a one-bit STBC field, a one-bit reserved field, a two-bit bandwidth (BW), a two-bit number of STS ($N_{STS}$), a nine-bit partial AID, a one-bit short guard interval, a two-bit coding, a four-bit MCS index, and a one-bit beam-change indication. The one-bit beam-change indication field indicates whether the beam steering matrices Q(k) have been changed. For example, a value of zero(0) indicates that the beam steering matrices are identical, and a value of one (1) indicates that the beam steering matrices have been changed across Omni and Data portions of the long preamble. Note that the beam-change indication bit can also be used as an indication for channel smoothing. For one spatial stream, if beam-change indication bit is set to zero, the receiver may do channel smoothing. Otherwise, smoothing is not recommended. For more than one spatial streams, beam-change indicator indicates channel smoothing only since steering matrix must be changed in this case.

Figure 3:
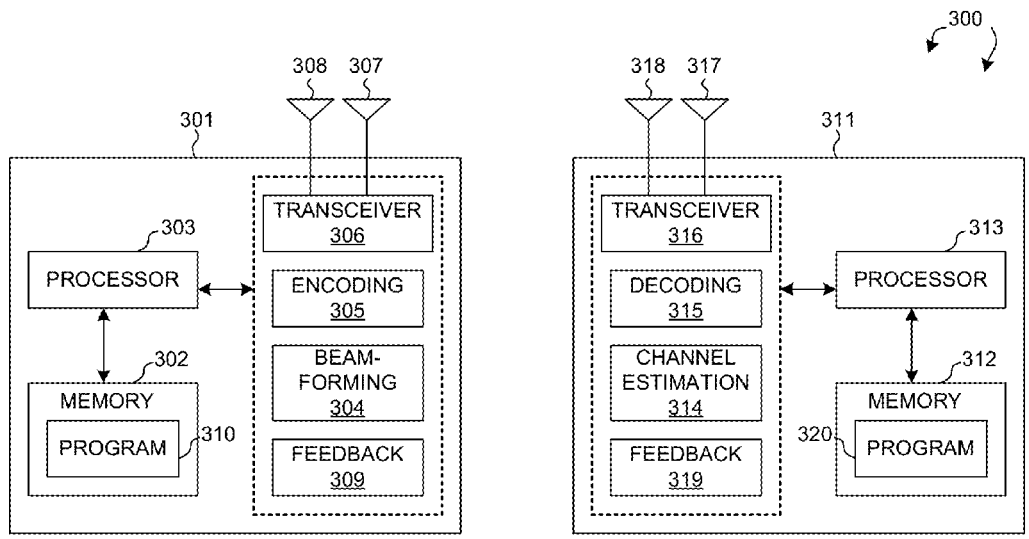
FIG. 3 is a simplified block diagram of a wireless transmitting device and a receiving device in accordance with a novel aspect.

FIG. 3 is a simplified block diagram of wireless devices 301 and 311 in accordance with a novel aspect. For wireless device 301, antennae 307 and 308 transmit and receive radio signals. RF transceiver module 306, coupled with the antennae, receives RF signals from the antennae, converts them to baseband signals and sends them to processor 303. RF transceiver 306 also converts received baseband signals from the processor, converts them to RF signals, and sends out to antennae 307 and 308. Processor 303 processes the received baseband signals and invokes different functional modules to perform features in wireless device 301. Memory 302 stores program instructions and data 310 to control the operations of the wireless device.

Similar configuration exists in wireless device 311 where antennae 317 and 318 transmit and receive RF signals. RF transceiver module 316, coupled with the antennae, receives RF signals from the antennae, converts them to baseband signals and sends them to processor 313. The RF transceiver 316 also converts received baseband signals from the processor, converts them to RF signals, and sends out to antennae 317 and 318. Processor 313 processes the received baseband signals and invokes different functional modules to perform features in wireless device 311. Memory 312 stores program instructions and data 320 to control the operations of the wireless device.

The wireless devices 301 and 311 also include several functional modules to perform embodiments of the present invention. In the example of FIG. 3, wireless device 301 is a transmitting device that includes an encoder 305, a beamforming module 304, and a feedback module 309. Wireless device 311 is a receiving device that includes a decoder 315, a channel estimation module 314, and a feedback module 319. Note that a wireless device may be both transmitting and receiving device. The different functional modules can be implemented by software, firmware, hardware, or any combination thereof. The function modules, when executed by the processors 303 and 313 (e.g., via executing program codes 310 and 320), allow transmitting device 301 and receiving device 311 to perform embodiments of the present invention.

In one example, at the transmitter side, device 301 generates multiple fields of a long preamble frame via various steps (e.g., apply beamforming/precoding over different training fields), and inserts a beam-change indication bit in a signal field of the long preamble frame. Device 301 then transmits the long preamble frame to the receiver. At the receiver side, device 302 receives the long preamble frame, performs channel estimation using the different training fields, and decodes the beam-change indication bit. If the beam-change indication bit is equal to one, then the receiver does not perform channel estimation enhancement because channel condition has changed between the different training fields. On the other hand, if the beam-change indication bit is equal to zero, then the receiver performs channel estimation enhancement by combining the channel estimation results from the different training fields because channel condition remains the same for the transmission of the different training fields. Various embodiments of such transmitting device and receiving device are now described below with accompany drawings.

Figure 4:
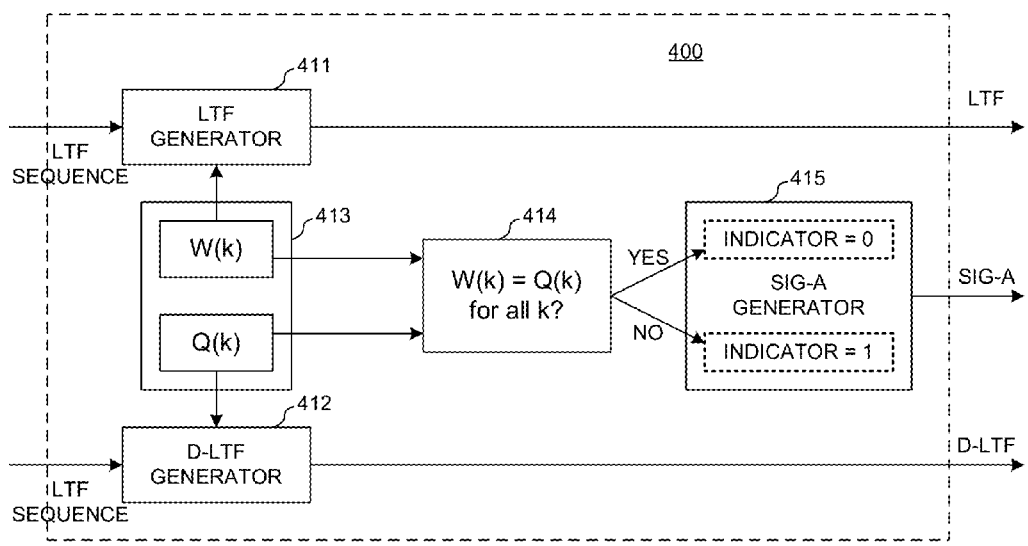
FIG. 4 is a diagram of a transmitting device that inserts a beam-change indicator.

FIG. 4 is a simplified diagram of a transmitting device 400 that inserts a beam-change indicator. Only relevant components pertinent to the present invention are illustrated below, while other irrelevant components are omitted. Transmitting device 400 comprises an LTF generator 411, a D-LTF generator 412, a beamforming module 413, a comparator 414, and a SIG-A generator 415. The transmitting device 400 first generates various training fields including LTF and D-LTF and SIG-A according to the following steps. LTF generator 411 takes a predefined LTF training sequence in the frequency domain, applies appropriate phase rotation, applies Cyclic Shift Diversity (CSD) for each space-time stream and frequency segment, applies precoding using a beam-steering matrices W(k) for each subcarrier, performs Inverse Discrete Fourier Transform (IDFT), adds guard interval (GI), and sends resulted LTF symbol(s) to analog and RF module for further processing. Similarly, D-LTF generator 412 takes the same predefined LTF training sequence in the frequency domain, applies appropriate phase rotation, applies CSD for each space-time stream and frequency segment, applies precoding using a beam-steering matrices Q(k) for each subcarrier, performs IDFT, adds GI, and sends resulted D-LTF symbol(s) to analog and RF module for further processing. The beam-steering matrices W(k) and Q(k) are determined by beamforming module 413 dynamically. For example, an identity matrix may be used to achieve omnidirectional transmission, while a beamforming matrix with precoding weighting may be used to achieve directional transmission for MIMO systems based on previous channel sounding feedback information.

After beamforming, transmitting device 400 then determines whether channel condition is changed between LTF and D-LTF symbol transmission. Comparator 414 compares the beam-steering matrices W(k) and Q(k) for each subcarrier. If W(k)=Q(k) for all subcarrier, then the channel condition has not changed and SIG-A generator 415 inserts a beam-change indication bit=zero into the SIG-A field. On the other hand, if W(k)≠Q(k) for at least one of the subcarriers, then the channel condition has changed. SIG-A generator 415 inserts a beam-change indication bit=one into the SIG-A field. In the upcoming IEEE 802.11ah standard, the SIG-A field is composed of two OFDM symbols, SIG-A1 and SIG-A2, each containing 24 data bits. The bits in SIG-A are coded, interleaved, and modulated into two OFDM symbols. Finally, the LTF, SIG-A, and D-LTF are encoded into a long preamble frame and transmitted to a corresponding receiving device.

Figure 5:
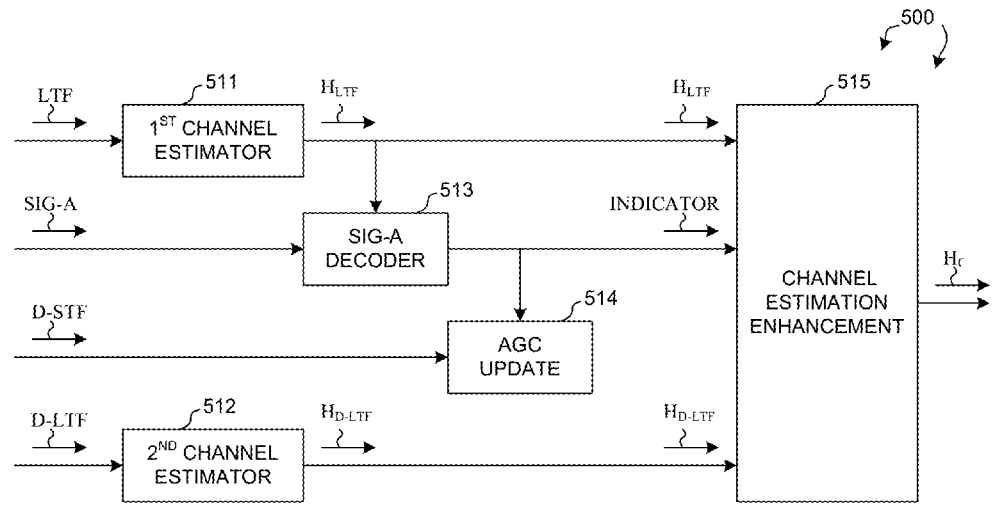
FIG. 5 is a first embodiment of a receiving device that performs channel estimation enhancement based on a beam-change indicator.

FIG. 5 is a first embodiment of a receiving device 500 that performs channel estimation enhancement based on a beam-change indicator. Receiving device 500 comprises a first channel estimator 511, a second channel estimator 512, a SIG-A decode 513, an AGC update module 514, and a channel estimation enhancement module 515. When a long preamble frame arrives at the receiver side, device 500 receives the long preamble frame in the order of the frame structure. Typically, device 500 receives the long preamble frame in the order of STF, LTF, SIG-A, D-STF, D-LTF, SIG-B, and data in OFDM symbols, and processes the received OFDM symbols of the long preamble frame in the same order accordingly. Only relevant operations pertinent to the present invention are described below while irrelevant operations are omitted.

A first channel estimation is performed based on the received LTF symbols by first channel estimator 511. As a result, a first channel response matrix $H_{LTF}$ is generated, which represents the corresponding channel condition for STF, LTF, and SIG-A symbol transmission. The first channel response matrix $H_{LTF}$ is output to channel estimation enhancement module 515. Next, SIG-A decoder 513 uses $H_{LTF}$ to decode the SIG-A field, and thereby obtains a beam-change indicator value. The beam-change indicator is also output to channel estimation enhancement module 515. In addition, device 500 also uses the indicator to determine whether to perform AGC update by AGC update module 514 over received D-STF symbol. This is because if channel condition has changed from the D-STF symbol, then device 500 needs to perform AGC update for changed signal level. Otherwise, if channel condition has not changed from the D-STF symbol, no AGC update is necessary. Next, a second channel estimation is performed over received D-LTF symbols by second channel estimator 512. As a result, a second channel response matrix $H_{D\text{-}LTF}$ is generated, which represents the corresponding channel condition for D-STF, D-LTF, SIG-B, and data symbol transmission. The second channel response matrix $H_{D\text{-}LTF}$ is also output to channel estimation enhancement module 515.

When beam-change indicator is zero, e.g., the beam-steering matrices W(k) and Q(k) are the same for all subcarriers, then channel estimation enhancement may be performed. The reason is that if the channel condition has not changed between the transmission of LTF and D-LTF symbols, then both LTF and D-LTF symbols may be used to increase the accuracy of channel estimation. In the embodiment of FIG. 5, channel estimation enhancement is performed by combining the first channel response matrix $H_{LTF}$ and the second channel response matrix $H_{D\text{-}LTF}$ as the follow equation:

$$Hc(k) = \frac{2*H(k)_{LTF} + H(k)_{D\text{-}LTF1}}{3}$$

where
Hc(k) is the final combined channel response matrix of data transmission for the $k^{th}$ subcarrier
H(k)LTF is the channel response matrix based on two LTF symbols for the $k^{th}$ subcarrier
$H(k)_{D\text{-}LTF1}$ is the channel response matrix based on the first D-LTF symbol for the $k^{th}$ subcarrier In the above equation, the LTF occupies two OFDM symbol, while the D-LTF occupies one OFDM symbol. Traditionally, the channel response matrix is estimated only based on the D-LTF symbol. As a result, the proposed channel enhancement method provides a 4.7 dB gain on channel estimation performance.

Figure 6:
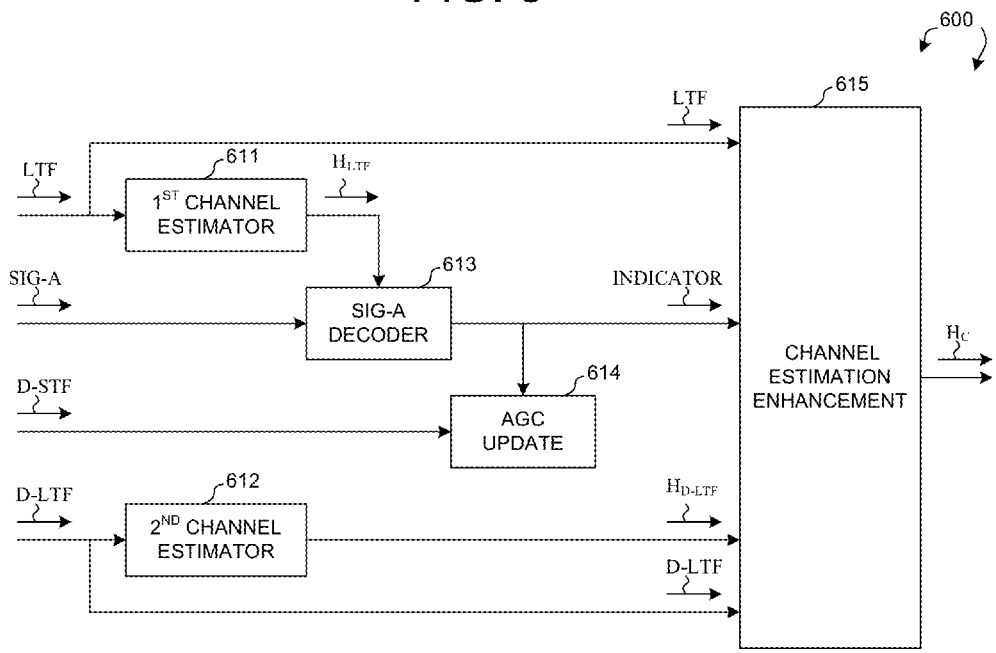
FIG. 6 is a second embodiment of a receiving device that performs channel estimation enhancement based on a beam-change indicator.

FIG. 6 is a second embodiment of a receiving device 600 that performs channel estimation enhancement based on a beam-change indicator. Receiving device 600 is similar to receiving device 500 of FIG. 5, which comprises a first channel estimator 611, a second channel estimator 612, a SIG-A decode 613, an AGC update module 614, and a channel estimation enhancement module 615. Similar to FIG. 5, when beam-change indicator is zero, e.g., the beam-steering matrices W(k) and Q(k) are the same for all subcarriers, then channel estimation enhancement may be performed. In the embodiment of FIG. 6, the channel estimation enhancement may be achieved by performing channel estimation based on the LTF and the D-LTF symbols directly.

As illustrated in FIG. 6, channel estimation enhancement module 615 takes received LTF symbols, received D-LTF symbol(s), the beam-change indicator, and the channel response matrix HD-LTF as inputs. If the beam-change indicator is set to one, then no channel estimation enhancement is performed, and the final combined channel response matrix $H_C = H_{D-LTF}$. On the other hand, if the beam-change indicator is set to zero, then channel estimation is performed based on two LTF symbols and one D-LTF1 symbol directly to obtain the final combined channel response matrix $H_C$. As a result, the proposed channel enhancement method also provides a 4.7 dB gain on channel estimation performance as in FIG. 5.

Figure 7:
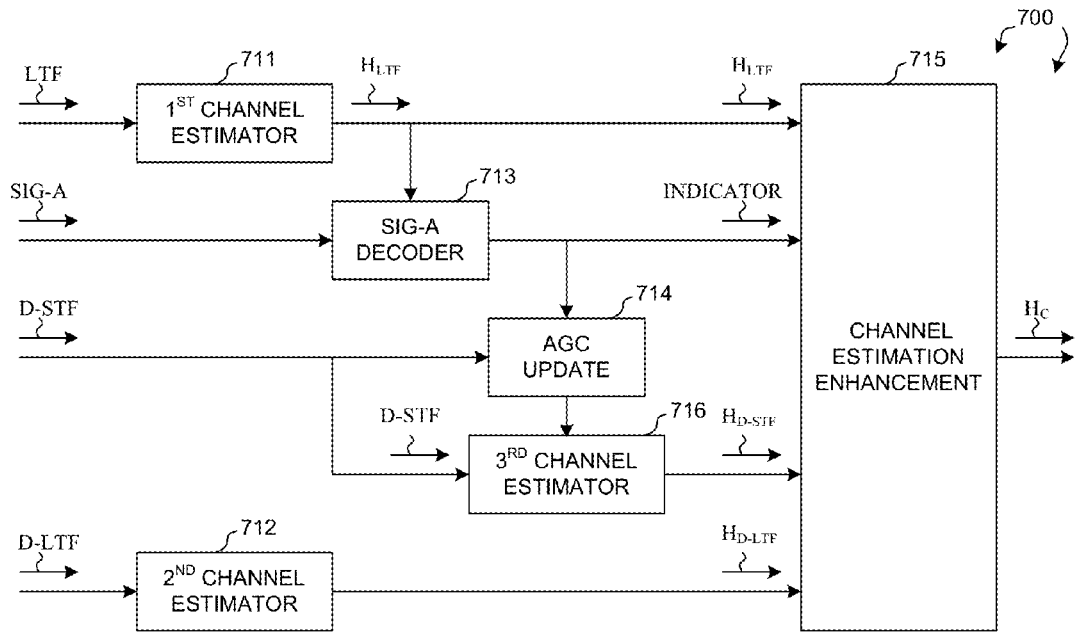
FIG. 7 is a third embodiment of a receiving device that performs channel estimation enhancement based on a beam-change indicator.

FIG. 7 is a third embodiment of a receiving device 700 that performs channel estimation enhancement based on a beam-change indicator. Receiving device 700 is similar to receiving device 500 of FIG. 5, which comprises a first channel estimator 711, a second channel estimator 712, a SIG-A decode 713, an AGC update module 714, and a channel estimation enhancement module 715. In addition, receiving device 700 comprises a third channel estimator 716 for further performance improvement of channel estimation. When beam-change indicator is zero, e.g., the beam-steering matrices W(k) and Q(k) are the same for all subcarriers, then channel estimation enhancement may be performed. The reason is that if the channel condition has not changed for the transmission of LTF, D-STF, and D-LTF symbols, then not only the received LTF and D-LTF symbols may be used to increase the accuracy of channel estimation, the received D-STF symbol may also be used to improve the channel estimation accuracy.

Figure 8:
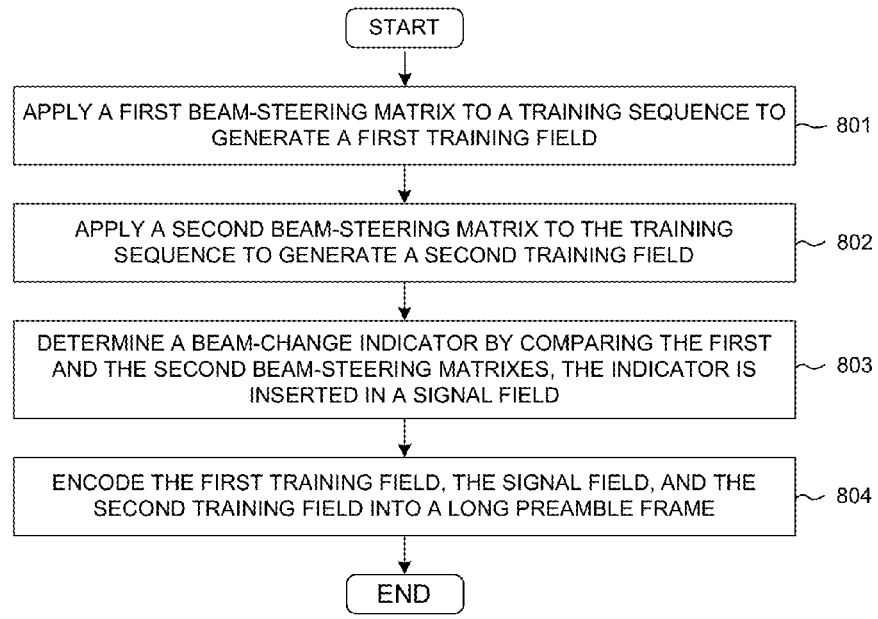
FIG. 8 is flow chart of a method of transmitting and encoding a long preamble frame with a beam-change indicator in accordance with a novel aspect.

In the embodiment of FIG. 7, D-STF is also taken into account for channel estimation enhancement. That is, the sub-channels corresponding to subcarriers that are non-zero in D-STF can be estimated by regarding D-STF as channel estimation training sequence. Denote such subcarriers as $k_{STF}$, which is a subset of all subcarriers, then the third channel estimator 716 performs channel estimation based on D-STF and generates a third channel response matrix $H_{D-STF}$ for those subcarriers $k_{STF}$. The final combined channel response matrix $H_C(k_{STF})$ may be represented as the following equation:

$$H_C(k_{STF}) = \frac{2 * H(k_{STF})_{LTF} + H(k_{STF})_{D-STF} + H(k_{STF})_{D-LTF1}}{4}$$

where
$H_C(k_{STF})$ is the final combined channel response matrix of data transmission for the $k_{STF}$ subcarrier
$H(k_{STF})_{LTF}$ is the channel response matrix based on two LTF symbols for the $k_{STF}$ subcarrier
$H(k_{STF})_{D-STF}$ is the channel response matrix based on the D-STF symbol for the $k_{STF}$ subcarrier
$H(k_{STF})_{D-LTF1}$ is the channel response matrix based on the first D-LTF symbol for the $k_{STF}$ subcarrier FIG. 8 is flow chart of a method of transmitting and encoding a long preamble frame with a beam-change indicator in accordance with a novel aspect. In step 801, a wireless device applies a first beam-steering matrix to a training sequence and generates a first training field. In step 802, the wireless device applies a second beam-steering matrix to the training sequence and generates a second training field. In step 803, the device determines a beam-change indication bit by comparing the first and the second beam-steering matrices for all subcarriers. If the matrices are the same for all subcarriers, then the beam-change indication bit is set to zero. Otherwise, it is set to one. The beam-change indicator bit is then inserted into a signal field. In step 804, the device encodes the first training field, followed by the signal field, followed by the second training field into a long preamble frame to be transmitted to a receiving device.

Figure 9:
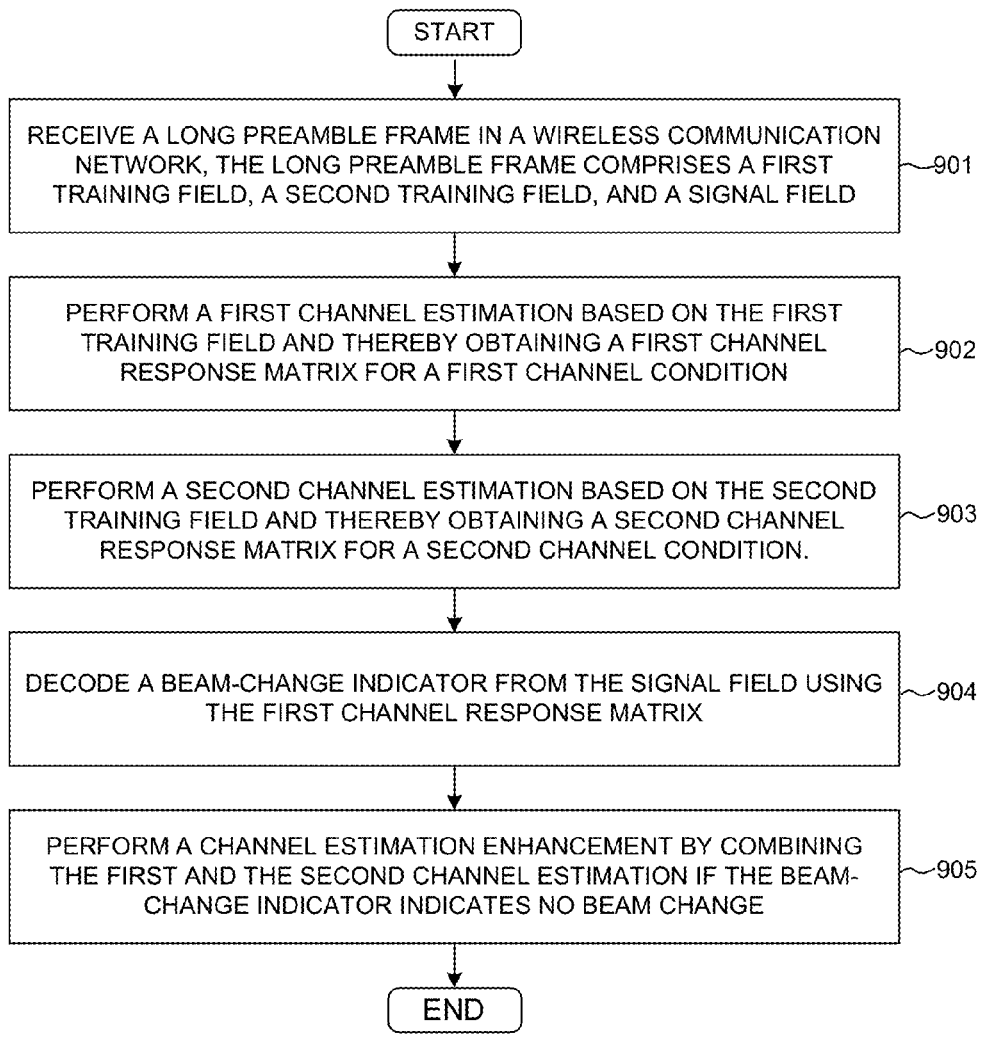
FIG. 9 is a flow chart of a method of receiving a long preamble frame and perform channel estimation enhancement in accordance with a novel aspect.

FIG. 9 is a flow chart of a method of receiving a long preamble frame and perform channel estimation enhancement in accordance with a novel aspect. In step 901, a wireless device receives a long preamble frame. The long preamble frame comprises a first training field, a second training field, and a signal field. In step 902, the device performs a first channel estimation based on the first training field and obtains a first channel response matrix for a first channel condition. In step 903, the device performs a second channel estimation based on the second training field and obtains a second channel response matrix for a second channel condition. In step 904, the device decodes a beam-change indication bit from the signal field using the first channel response matrix. In step 905, the device performs channel estimation enhancement by combining the first channel estimation and the second channel estimation results if the beam-change indication indicates no beam change between the first channel condition and the second channel condition.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving a long preamble frame in a wireless communication network by a wireless device, wherein the long preamble frame comprises a first training field, a signal field, and a second training field;
performing a first channel estimation based on the first training field and thereby obtaining a first channel response matrix for a first channel condition;
performing a second channel estimation based on the second training field and thereby obtaining a second channel response matrix for a second channel condition; and
performing a channel estimation enhancement based on a beam-change indicator in the signal field, wherein the beam-change indicator indicates whether there is beam change between the first channel condition and the second channel condition, wherein the channel estimation enhancement involves deriving an enhanced channel response matrix based on both the first training field and the second training field, and wherein the channel estimation enhancement involves deriving the enhanced channel response matrix by combining the first channel response matrix and the second channel response matrix.

2. The method of claim 1, wherein the wireless device decodes the beam-change indicator using the first channel response matrix.

3. The method of claim 1, wherein the wireless device uses the beam-change indicator to determine whether to perform automatic gain control update.

4. The method of claim 1, wherein the wireless device uses the beam-change indicator to determine whether to apply channel smoothing.

5. A method comprising:
receiving a long preamble frame in a wireless communication network by a wireless device, wherein the long preamble frame comprises a first training field, a signal field, and a second training field;
performing a first channel estimation based on the first training field and thereby obtaining a first channel response matrix for a first channel condition;
performing a second channel estimation based on the second training field and thereby obtaining a second channel response matrix for a second channel condition; and
performing a channel estimation enhancement based on a beam-change indicator in the signal field, wherein the beam-change indicator indicates whether there is beam change between the first channel condition and the second channel condition, wherein the channel estimation enhancement involves deriving an enhanced channel response matrix based on both the first training field and the second training field, and wherein the channel estimation enhancement involves deriving the enhanced channel response matrix by performing a third channel estimation using both the first training field and the second training field.

6. The method of claim 5, wherein the wireless device decodes the beam-change indicator using the first channel response matrix.

7. The method of claim 5, wherein the wireless device uses the beam-change indicator to determine whether to perform automatic gain control update.

8. The method of claim 5, wherein the wireless device uses the beam-change indicator to determine whether to apply channel smoothing.

9. A method comprising:
receiving a long preamble frame in a wireless communication network by a wireless device, wherein the long preamble frame comprises a first training field, a signal field, a second training, and a third training field;
performing a first channel estimation based on the first training field and thereby obtaining a first channel response matrix for a first channel condition;
performing a second channel estimation based on the second training field and thereby obtaining a second channel response matrix for a second channel condition;
performing a third channel estimation using the third training field and thereby obtaining a third channel response matrix; and
performing a channel estimation enhancement based on a beam-change indicator in the signal field, wherein the beam-change indicator indicates whether there is beam change between the first channel condition and the second channel condition, wherein the channel estimation enhancement involves deriving an enhanced channel response matrix based on both the first training field and the second training field, and wherein the channel estimation enhancement involves deriving the enhanced channel response matrix by combining the first, the second, and the third channel response matrixes.

10. The method of claim 9, wherein the wireless device decodes the beam-change indicator using the first channel response matrix.

11. The method of claim 9, wherein the wireless device uses the beam-change indicator to determine whether to perform automatic gain control update.

12. The method of claim 9, wherein the wireless device uses the beam-change indicator to determine whether to apply channel smoothing.

13. A wireless device, comprising:
a receiver that receives a long preamble frame in a wireless communication network, wherein the long preamble frame comprises a first training field, a signal field, and a second training field;
a first channel estimator that performs a first channel estimation based on the first training field and thereby obtaining a first channel response matrix for a first channel condition;
a second channel estimator that performs a second channel estimation based on the second training field and thereby obtaining a second channel response matrix for a second channel condition; and
a channel estimation enhancement module that performs a channel estimation enhancement based on a beam-change indicator in the signal field, wherein the beam-change indicator indicates whether there is beam change between the first channel condition and the second channel condition, wherein the channel estimation enhancement involves deriving an enhanced channel response matrix based on both the first training field and the second training field, and wherein the channel estimation enhancement involves deriving the enhanced channel response matrix by combining the first channel response matrix and the second channel response matrix.

14. The device of claim 13, wherein the wireless device decodes the beam-change indicator using the first channel response matrix.

15. The device of claim 13, wherein the wireless device uses the beam-change indicator to determine whether to perform automatic gain control update.

16. The device of claim 13, wherein the wireless device uses the beam-change indicator to determine whether to apply channel smoothing.

* * * * *